No. 787,224.         PATENTED APR. 11, 1905.
J. R. SCOFIELD.
ROTARY ENGINE.
APPLICATION FILED JUNE 18, 1904.
10 SHEETS—SHEET 1.
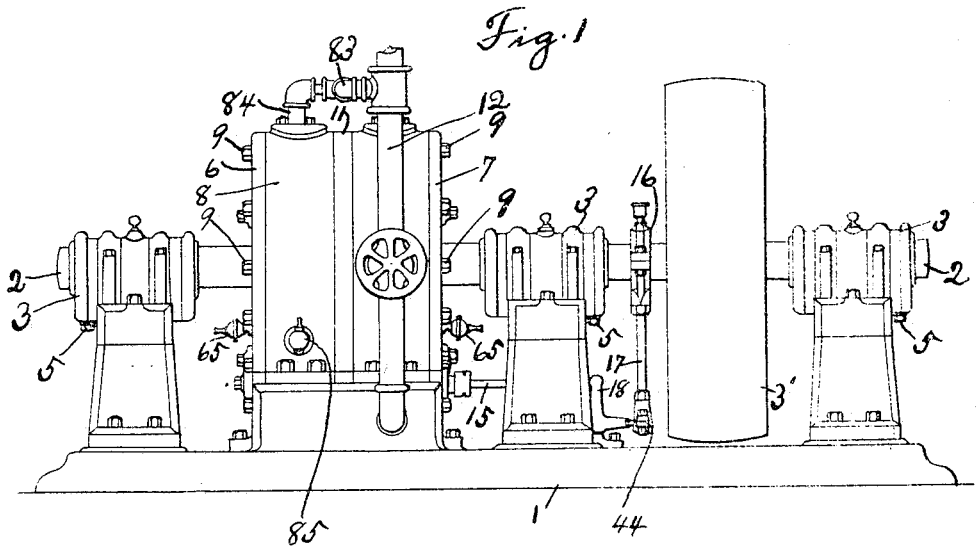
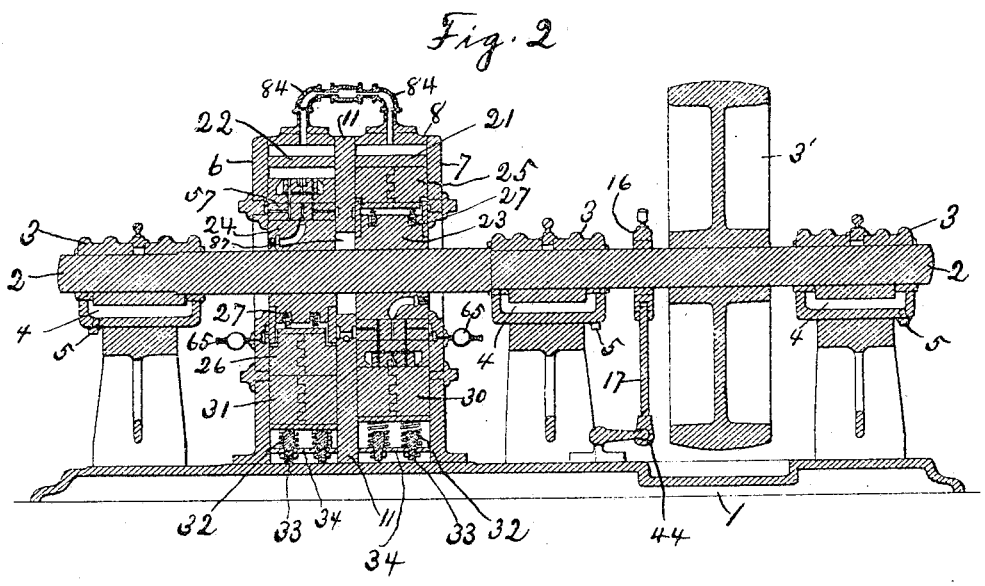
Witnesses
H. B. Rittenberry
J. N. Makley
Inventor,
J. R. Scofield
By A. L. Jackson
Attorney

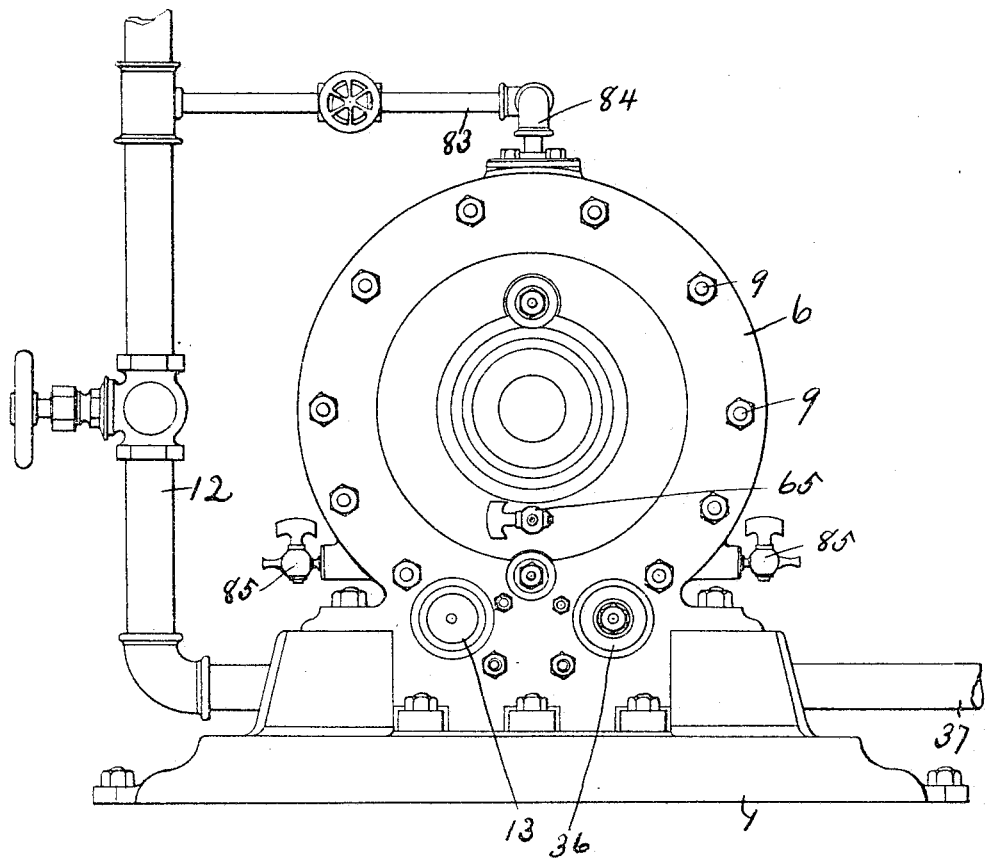

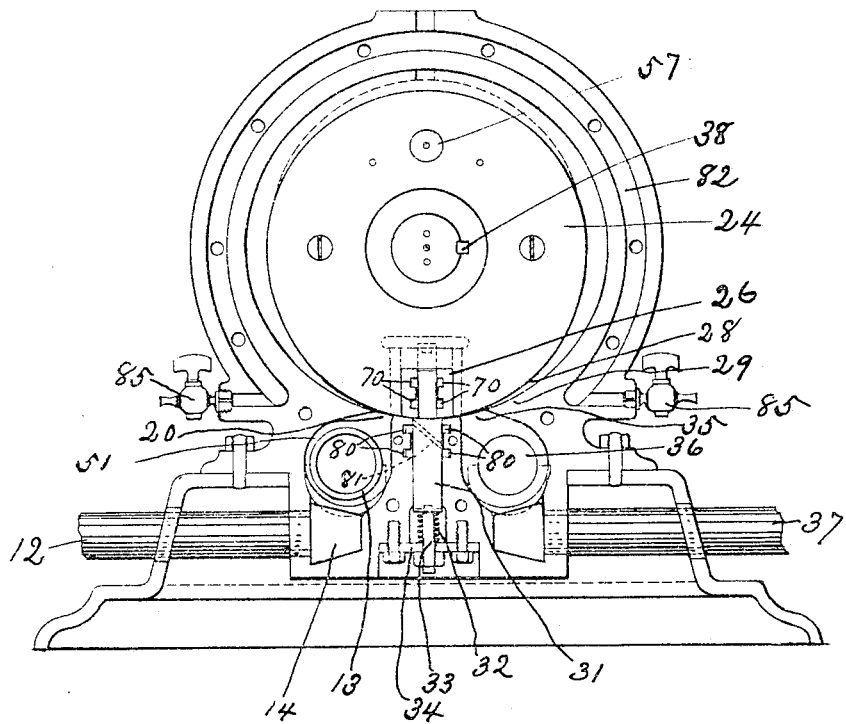

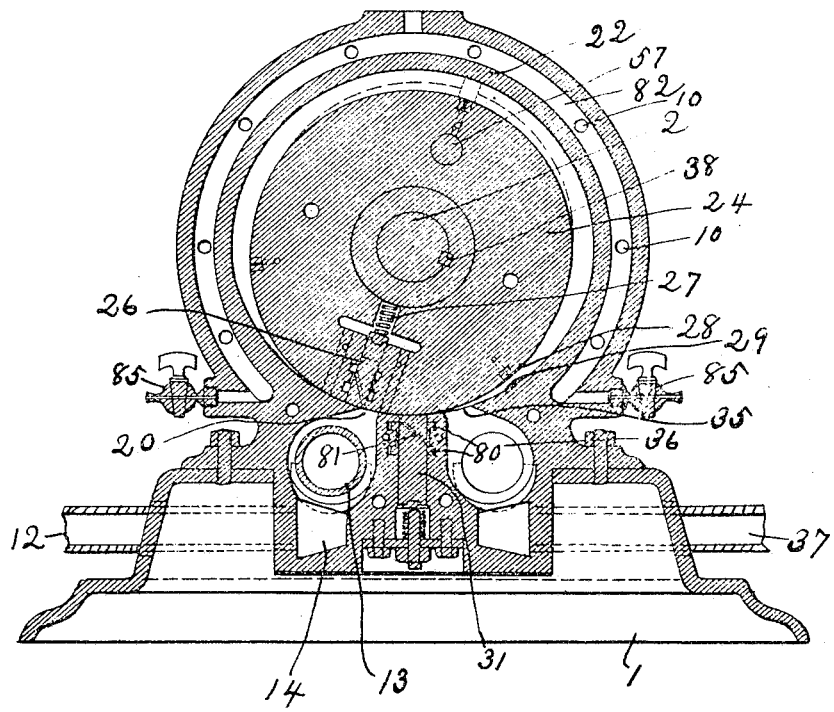

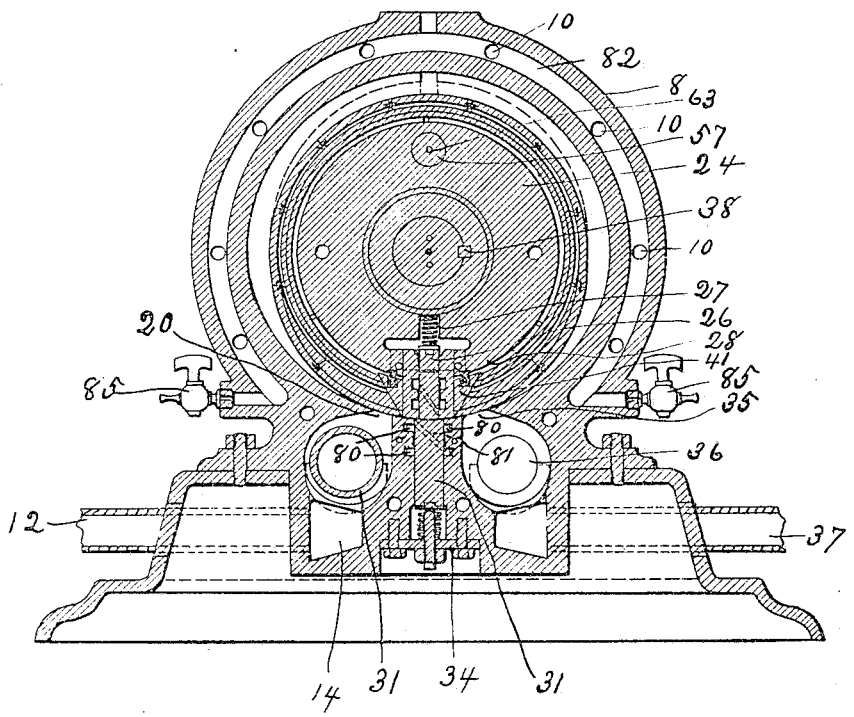

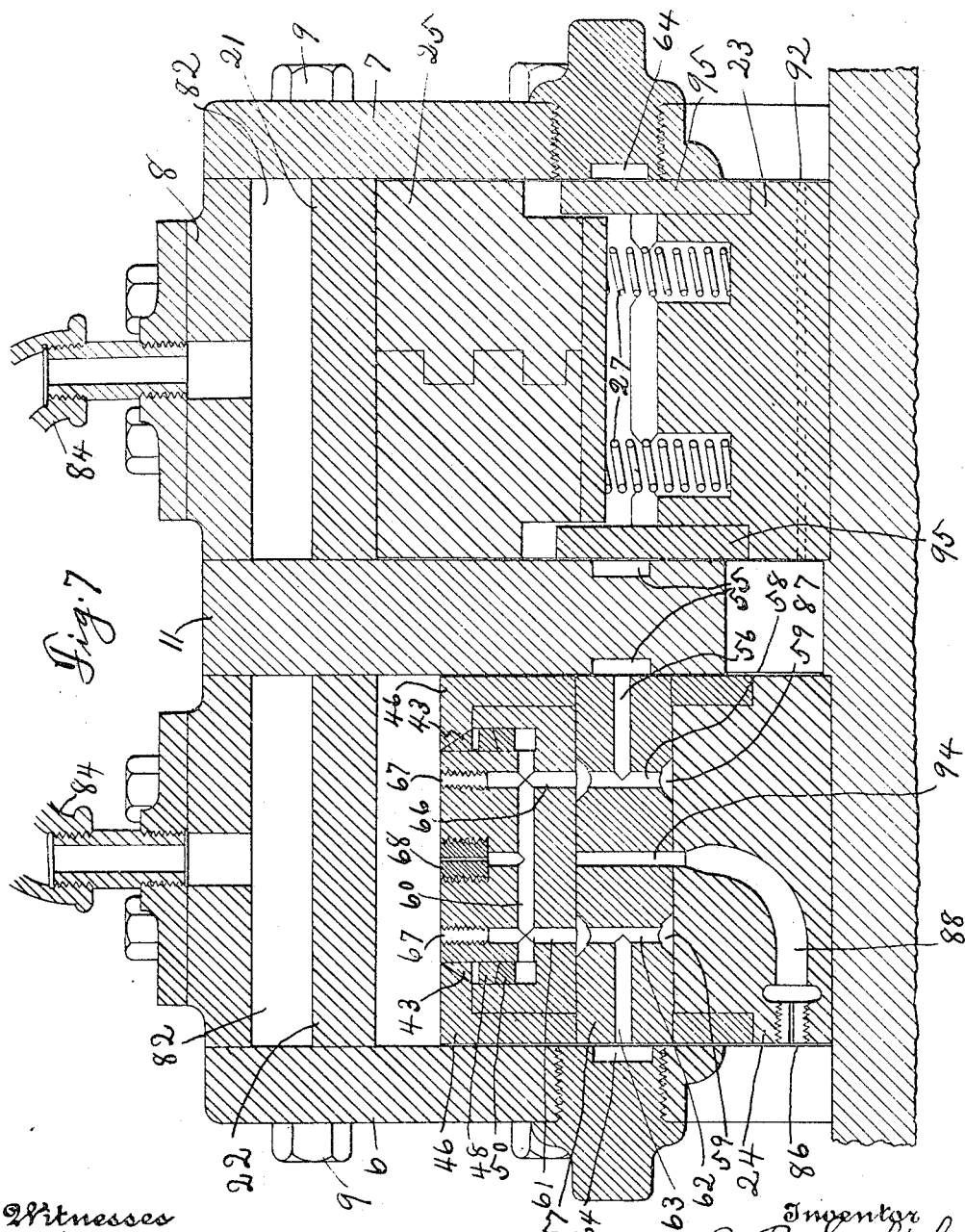

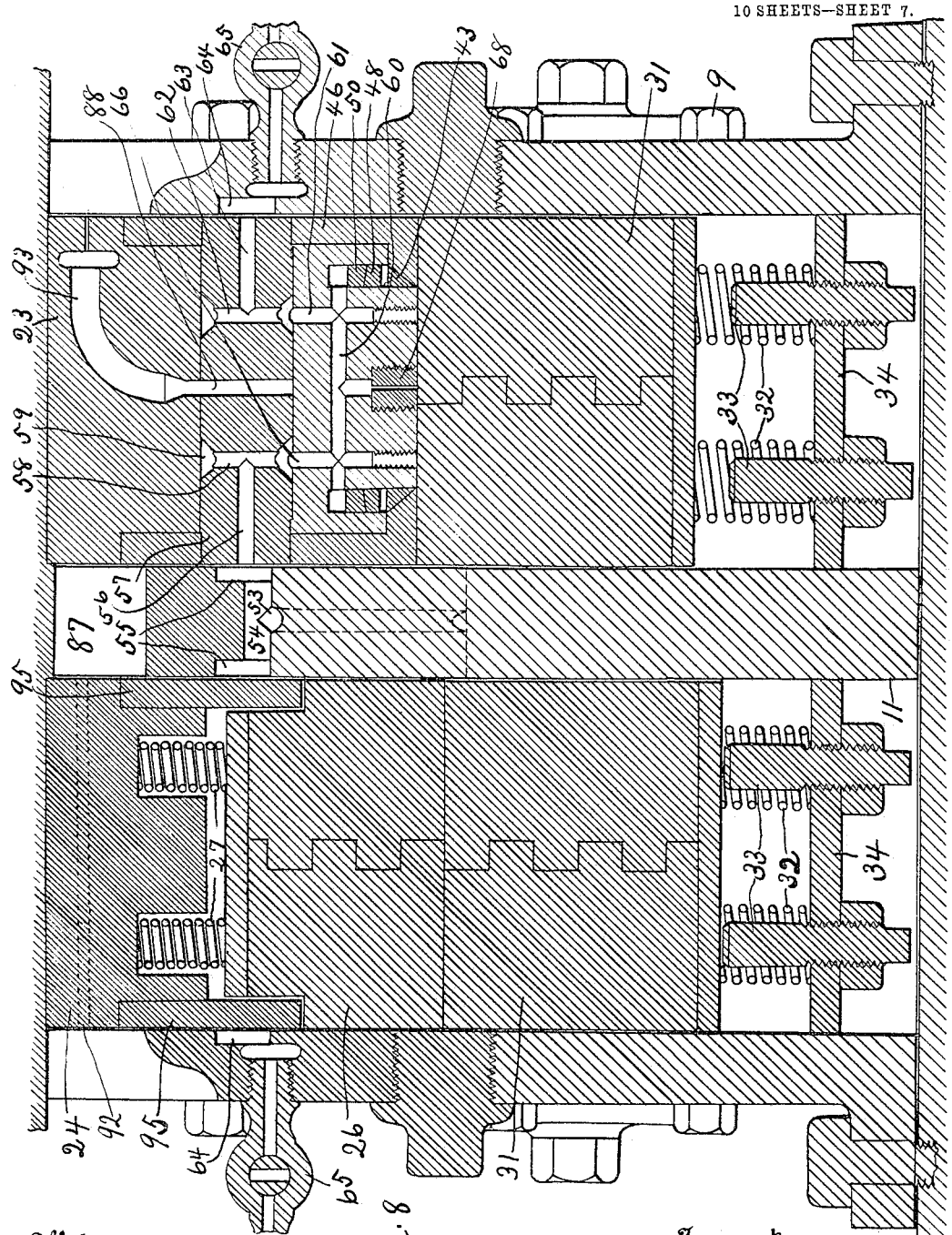

No. 787,224. PATENTED APR. 11, 1905.
J. R. SCOFIELD.
ROTARY ENGINE.
APPLICATION FILED JUNE 18, 1904.
10 SHEETS—SHEET 8.
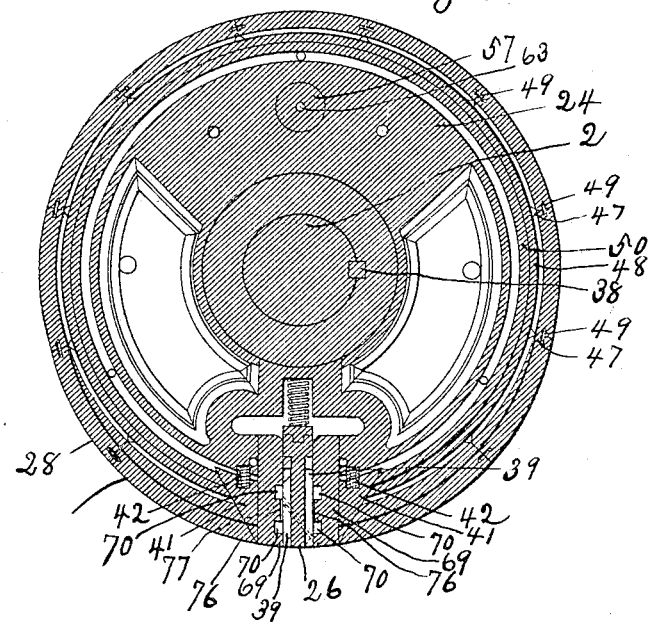
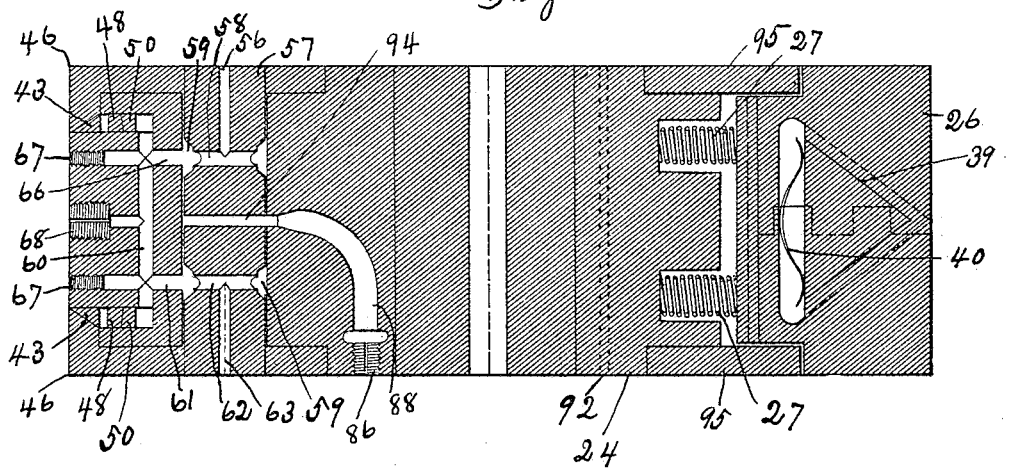

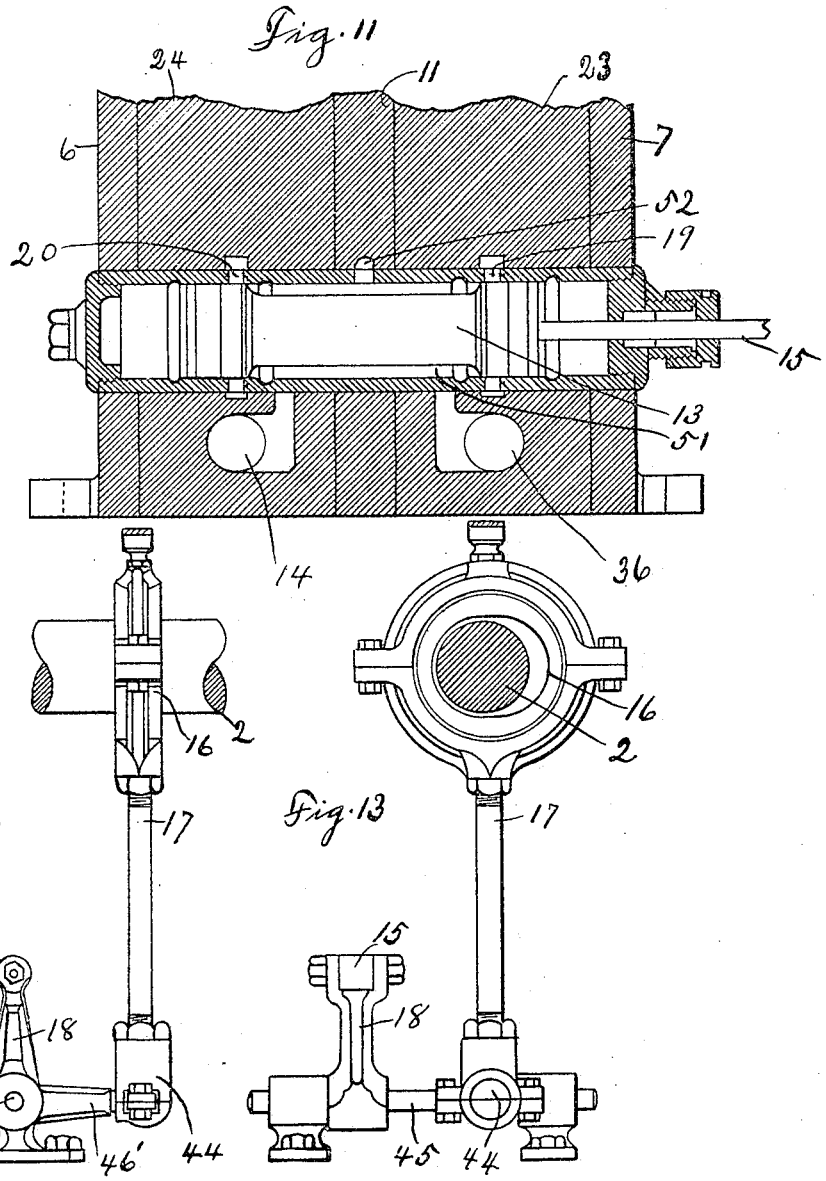

No. 787,224. PATENTED APR. 11, 1905.
J. R. SCOFIELD.
ROTARY ENGINE.
APPLICATION FILED JUNE 18, 1904.
10 SHEETS—SHEET 10.
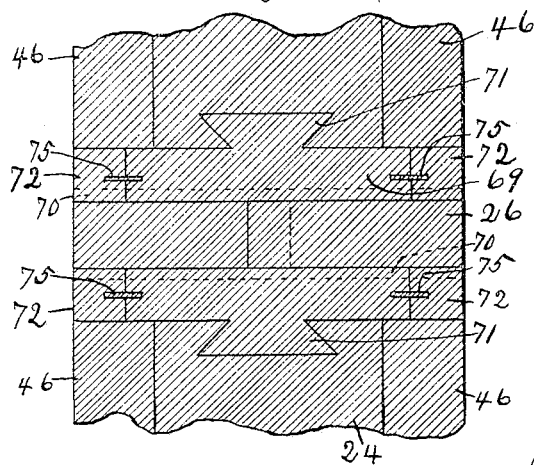
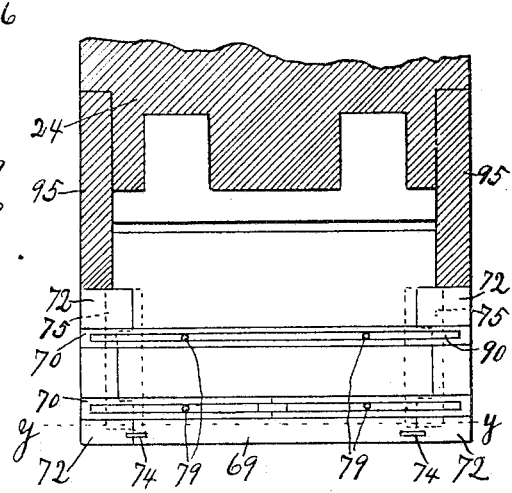
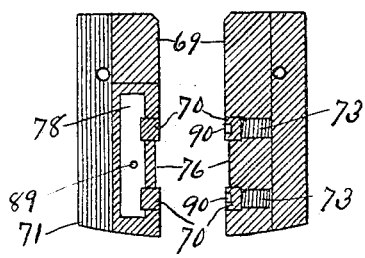
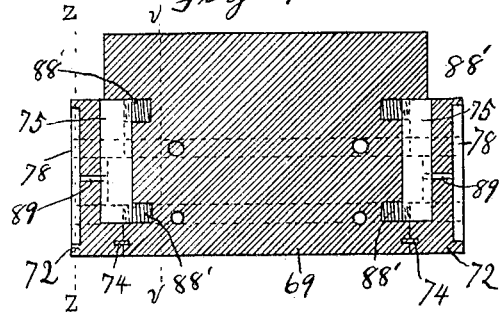
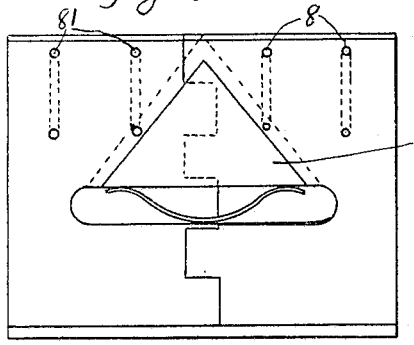
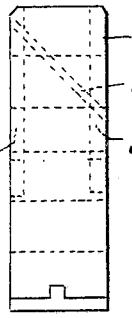
Witnesses
W. B. Rittenbarry
J. N. Makley
Inventor
J. R. Scofield,
By A. L. Jackson,
Attorney No. 787,224.                                               Patented April 11, 1905.

UNITED STATES PATENT OFFICE.

JOHN R. SCOFIELD, OF DALLAS, TEXAS.

ROTARY ENGINE.

SPECIFICATION forming part of Letters Patent No. 787,224, dated April 11, 1905.

Application filed June 18, 1904. Serial No. 213,167.

*To all whom it may concern:*

Be it known that I, JOHN R. SCOFIELD, a citizen of the United States, residing at Dallas, Texas, have invented certain new and useful Improvements in Rotary Engines, of which the following is a specification.

This invention relates to rotary engines, and more particularly to rotary steam-engines; but the invention is readily adaptable for rotary pumps and hydrocarbon-engines; and the object is to produce an engine which will give the greatest power at the least expense and which will be simple in operation, durable, and which will automatically pack itself.

The principal difficulty with rotary engines heretofore produced is the packing. Such engines generally waste much steam, because no practical remedy for the waste of steam has been found.

One object of this invention is to provide means for taking up the wear of the mechanical elements which are subject to abrasion by friction and in which all working parts are steam-balanced, thus causing the least possible wear by abrasion.

Another object is to divide the travel of the pistons or vanes whereby an increase of speed is obtained without danger of displacing the elements of or breaking the engine. In the construction described below the pistons travel one-half of the distance necessary to make the cut-off. Friction is in this manner decreased and the engine runs smoothly without wabbling or jarring, such as is the case with those engines in which the pistons travel the whole radial distance necessary to form cut-offs. I have provided also a system of packing for the pistons and the piston-carrying disks or wheels, by which a perfect balance of the pistons with steam is obtained, whereby the leaking of steam and friction are effectually prevented.

Other objects and advantages will be fully explained in the following description, and the invention will be more particularly pointed out in the claims.

Reference is had to the accompanying drawings, which form a part of this specification and application.

Figure 1 is a side elevation of the complete engine. Fig. 2 is a vertical section of the engine, as shown in Fig. 1. Fig. 3 is an end elevation of the engine. Fig. 4 is an elevation of the engine with one of the heads removed to illustrate one pair of the pistons and various other mechanism. Fig. 5 is a vertical section illustrating the construction of the engine-pistons and also illustrating the position of the pistons and the position of the revolving disks when moved farther round in the casing than is shown in the previous view and shows the engine-piston in a position to commence admitting steam. Fig. 6 is a vertical section along the line $x$ $x$ of Fig. 2, showing the position of pistons as the revolving piston passes the non-revolving piston. Fig. 7 is a broken sectional view, on an enlarged scale, this view being the upper half of the view shown in Fig. 2. Fig. 8 is a view on the same scale as Fig. 7 and the section along the same line, this being the lower half of Fig. 2. Fig. 9 is a vertical cross-section of one of the pistons and one of the piston-carrying wheels. Fig. 10 is a longitudinal section of one of the pistion-carrying disks and of one of the pistons. Fig. 11 is a broken sectional view of the parts about the reciprocating feed and exhaust valve. Fig. 12 is a detail view of the eccentric mechanism for operating the feed and exhaust valve. Fig. 13 is another detailed view of the same mechanism, the view of this figure being at right angles to the view shown in Fig. 12. Fig. 14 is a broken sectional view taken along the line $y$ $y$ of Fig. 15. Fig. 15 is a face view of one of the packing or bearing plugs of the piston. Fig. 16 is a sectional edge view of the packing or bearing plug for the piston, the left view being on line $z$ $z$ and the right view on line $v$ $v$ of Fig. 17. Fig. 17 is a section of the view shown in Fig. 15, showing a sectional view of the plug and the break-joints and other mechanism. Fig. 18 is a side elevation of one of the pistons located in the casing of the engine. Fig. 19 is an edge view of the same.

Similar characters of reference are used to indicate the same parts throughout the several views.

This engine is provided with a suitable base 1, a shaft 2, bearings 3 for the shaft, and a drive or balance wheel 3'. The bearings 3 have suitable ring oil-cups 4 and a drain 5 for the oil-cups. The engine is provided with heads 6 and 7, which are bolted to the casing 8 by bolts 9, which run entirely through the casing, the casing having bolt-holes 10. The casing 8 is divided centrally into two parts by a partition 11, which also divides the engine into two parts, forming distinct cylinders, but connected as hereinafter described. An inlet-pipe 12, leading from a suitable boiler or power-supply source, is connected to the two cylinders by being connected with the valve 13 through the port 14. The valve 13 is operated by a rod 15, which is given an axial reciprocatory motion by an eccentric 16. The eccentric 16 is mounted on the shaft 2 and is provided with a connecting-rod 17, which is pivotally connected by a ball-joint 44 to an arm 46', and the arm 46' is rigid on the shaft 45, and the lever 18 is also rigid on the shaft 45. The rod 17 is secured in the socket of the ball-joint 44. The lever 18 is pivotally connected to the rod 15, and this rod is connected to the valve 13. The valve 13 is cylindrical and has a peripheral cut-out intermediate the ends thereof, so that the steam will have free circulation around the same, and this cut-out is made long enough to adapt the valve to feed steam alternately to ports 19 and 20, which have communication with the cylinders 21 and 22, which are separated by the partition 11. Piston-carrying wheels or disks 23 and 24 are mounted in the cylinders 21 and 22, respectively. The disk 23 carries a piston 25, which moves radially and reciprocatingly in the disk, and the disk 24 carries a piston 26, which moves radially and reciprocatingly in the disk. The pistons 25 and 26 are actuated by springs 27, seated in the disks to make said pistons cut off the steam. The disks 23 and 24 each have cams on the peripheries thereof. These disks are similar in all respects. For this reason only one disk is described and illustrated in detail with the various attachments for making the said disk operative. The disk 24 has one cam 28 on the periphery thereof. This piston moves radially through the crest of the cam 28. The spring 27 causes the piston 26 to follow the interior surface of the cylinder as the disk is revolved. A coöperating concave cam 29 is formed on the interior of the surface of the cylinder. Coöperating pistons 30 and 31 are mounted in the casing. The pistons 30 and 31 correspond and coöperate, respectively, with the pistons 25 and 26. The pistons 30 and 31 are movable concentrically or radially and reciprocatingly through the crest of the cam 29 of the casing. These pistons are actuated by the springs 32, which keep these pistons bearing on the surfaces of the disks 23 and 24. The springs 32 are provided with adjustable seats 33, which are mounted in the partitions 34 in the casings 21 and 22. The pistons 30 and 31 act as permanent cut-offs, separating the intake from the exhaust; but these pistons do more than this. They divide the distance the revolving pistons would have to travel if these pistons 30 and 31 were not coöperating with the revolving pistons 25 and 26. The advantage of this construction and arrangement is that the revolving pistons do not have to travel so far radially. The friction is reduced, and the disturbance of such long strokes or sweeps of the pistons is avoided. Each cylinder is provided with an exhaust-port 35, and the ports 35 connect with a common cylindrical opening 36 and the exhaust-pipe 37 is connected with the opening 36. It is thus seen that the engine is provided with two cylinders, and a common steam-inlet is provided for the two cylinders and a common exhaust is also provided for the two cylinders. The pistons 30 and 31 are located adjacent to each other; but the pistons 25 and 26 are arranged diametrically opposite each other. This arrangement is made to avoid a dead-center and to secure a constant propelling power. The wheels or disks 23 and 24 are made rigid with the shaft 2 by means of a suitable key 38. In operation when the cam 28 of the disk 24 is approaching the cam 29 of the casing the piston 26 is retreating in the disk 24 by reason of the springs 27, and the piston 31 is retreating in the casing by reason of the springs 32, and when the crest of the cam 28 is exactly oppositely adjacent the crest of the cam 29 the outer end of the piston 26 is flush with the surface of the cam 28, and the outer end of the piston 31 is flush with the surface of the cam 29. At the same time the piston 25 will be diametrically opposite the piston 30, and thus prevent the possibility of locking on a dead-center. As soon as the piston 26 passes the piston 31 steam is admitted to take effect on the piston 26 for driving the same, the piston 31 serving as a base of pressure to utilize the expansive force of the steam. The expansive force of the steam takes effect on the end of the piston 26 as this piston gradually moves out of the disk 24. In revolving the piston will follow the surface of the cam 29 until this surface is lost in the circular surface of the cylinder and then follow the inner surface of the cylinder, being forced to revolve by the expansive force of the steam. In moving on around the cylinder the piston will expel the exhaust through the port 35. Each disk, with its piston and the coöperating piston, operates in the same manner, one cylinder to some extent balancing the other and serving always to prevent locking on a dead-center. The time of the commencement of the admission of steam into the cylinder 22 must follow instantaneously the opening of port 20 by valve 13 with the admission of steam through said port, and the revolution of the cylinder must be timed with the thrust of the valve 13. The valve 13 is so arranged that the port 20 is closed while the port 19 is open, and vice versa. When the port 20 begins to open, the port 19 begins to close, and vice versa. The valve 13, as here shown, is arranged to feed steam during one-half of a revolution of each disk 23 and 24. This may be varied by any suitable automatic governor. The pistons are all made in two parts and dovetailed together, as shown in the enlarged views of Figs. 7 and 8. The dovetailed faces of the piston 26 are covered by triangular plates 39, and these plates are pressed outward by springs 40. These plates prevent the leakage of steam through the dovetailed joints. Springs 40' tend to force these plates 39 toward the surface or face of the disks. The packing about the edges of the piston consists of triangular wedges 41, which are pressed outward by springs 42. These wedges 41 will press outward to take up the wear of the soft brass ring 43 of the disk 24. The rings 43 will press outward to take up the wear of the L-shaped annuli 46 against the casings 6 and 7 and against the partition 11. These rings 43 will press out as the annuli wear and yield toward the casings 6 and 7 and the partition 11, and the edges of the rings 43 will be worn away by friction against the pistons 30 and 31. The rings 43 are not continuous, but stop against the wedges 41. The rings 43 are also divided into sections, as shown in Fig. 9, and provision is made for taking up the wear between each section and the adjacent section. Small saddles or wedges 47 are placed between the rings 43 and cast-iron packing-rings 48. As the rings 43 wear and the sections begin to separate the wedges 47 will press outward and hold the sections of the rings 43 in their relative positions and the steam is prevented from passing in between the sections by means of stop-blocks 49, which are used to join the sections of the rings 43 together after the manner of dowel-pins or break-joints. The ring 48 is also divided and the ends rest against the wedges 41. The cast-iron ring 50 is similarly arranged. The rings 48 and 50 are steam-packing rings and will automatically press in opposite directions by reason of the inclined faces toward each other, and thus prevent steam from passing out of the wheels or disks 23 and 24. Steam is admitted into the disks to keep these rings 48 and 50 pressed outward, and these rings keep the wedges 47 pressed outward. Steam is admitted to the disks in the following manner: Steam is taken from the steam-chest 51, (in which the valve 13 is mounted,) through a port 52, thence through a duct 53 in the partition 11, connecting with an annular duct 54, which connects with two annular grooves 55, one in each side of the partition 11. Consequently there is live steam in the grooves 55 at all times. Steam passes from the grooves 55, through ducts 56 in pistons 57, to cross-ducts 58, (diametrically through the pistons 57,) and thence connects with annular grooves 59 in the pistons 57. The pistons 57 may be called "perforated plugs." They serve only as means for passing the steam through the disks 23 and 24 to expand the packing-rings located therein. From the annular grooves 59 the steam passes to the ducts 60 through the perforations 66. From the ducts 60 steam passes to the packing-rings 50. Any water that may be accumulated in or about the ducts 60 will escape through the perforations 61, perforations 62, through the plugs 57 and ducts 63, and thence to the annular groove 64, whence the water may be drawn off through the drain-cocks 65. The grooves 64, as well as the grooves 55, are for balancing the disks or wheels 23 and 24—that is, balancing each entire disk—the grooves 55 permitting steam to press against the inside of the disks and the grooves 64 permitting steam to press against the outside of these disks, and at the same time the steam counterbalancing the steam acting on the packing-rings 50 and 49, located near the peripheries of the disks, the steam being admitted at steam-chest pressure. The perforations 61 and 66 are made by boring or drilling through from the peripheries of the disks 23 and 24 and then filling the outer parts of the perforations with plugs 67. A drain-duct leads to the duct 60 and a drain-plug 68, having a small passage therethrough, closes the duct. The object of this plug is to let a small quantity of steam pass constantly or continually through to prevent condensation of steam in the various ducts or passages. The steam which passes through in this manner goes into the cylinders 21 and 22 and passes out with the general exhaust through the ports 35.

The mechanism just described constitutes the means for packing the disks or piston-carrying wheels. Plugs 69 are dovetailed into the disks 23 and 24 to constitute bearings for the pistons 25 and 26 and the packing-bars of these pistons. The packing-bars are steam-balanced, and the plugs themselves are steam-balanced. The piston packing-bars 70 are embedded in the plugs 69. The plugs 69 have ribs 71 on the back thereof, which are dovetailed into the disk 24. These plugs 69 are composed of three parts—a body portion and wings 72, which are dovetailed into the body portion 69. The packing-bars 70 are countersunk into the faces of the plugs 69. Spiral springs 73 are also countersunk in the plugs 69, tending to press the bars 70 out against the piston 26. In order that the plugs 69 may not bind against the piston 26, grooves 90 are formed in the bars 70, and any steam that may leak through the dovetailed joints of the plugs will not press the bars 70 against the piston. The steam comes through the holes 79 in bars 70, which holes open into the grooves 90. In this manner the steam will tend to balance the pressure of the springs 73. Steam is prevented from going endwise through the dovetailed joints 69 by means of stops 74, which are countersunk in the plugs 69 after the manner of dowel-pins or break-joints. Steam is prevented from going through the plugs 69 from the back to the front by means of stop-plates 75, which are also countersunk in the plugs 69 longitudinally across the dovetailed joints in the plugs 69. The object in having the plugs formed of three parts dovetailed together is to allow these plugs to expand and take up the wear of the plugs against the casing 6 and the partition 11 and the casing 7 and the partition 11. The plugs 69 are cut out at 76 between the bars 70 to receive steam on each side of the piston 26 and to balance the piston and prevent friction. Steam is admitted to the cut-out 76 through the ports 77, (indicated in the dotted outline of the piston 26.) Cut-outs 78 are formed in the edges of the plugs 69 to receive steam to balance the edges of the plugs 69 to prevent friction of the plugs 69 against the casings 6 and 7 and the partition 11, caused by springs 88'. Steam is admitted to cut-outs 78 through holes 89 through the plugs 69. Holes 79 are made in the bars 70. The expansive force of the steam would tend to bind the piston 26 against the plugs 69 on one side as the expansive force of the steam drives the piston. In order to overcome this friction, ports 77 are made through the piston, so that steam may pass from the cylinder to the cut-outs 76, and thus act on that side of the piston to prevent the piston from binding against the plugs 69 on that side. The piston 31 is provided with packing-bars 80, which are embedded in the casing. Steam is admitted between these bars through ports 81, which are shown in the dotted outline in Figs. 4 to 6, inclusive. Packing-plates 39' (similar to packing-plates 39) are also embedded in the pistons 30 and 31. The steam between the packing-bars 80 and the piston offsets the pressure of the steam against the parts of the pistons 30 and 31, which intermittently project out of the cams 29.

Means are provided for heating the casings. A groove 82 is formed in the casing encircling the greater part of the casing. A steam-inlet pipe 83 connects with the groove 82 and is connected to the steam-pipe 12. The pipe 83 is connected to the groove 82 by branch pipes 84. The grooves 82 may be drained by drain-cocks 85. The groove 82 forms a steam-jacket for the casing when steam is used, and if it is not necessary to heat the cylinders this space made by the groove 82 forms a dead-air space which makes a kind of cushion when the cylinders are used for pumping purposes. When it is desired to use the cylinders for hydrocarbon-engines, the spaces 82 may be filled with water. If for any reason steam is condensed in the annular spaces 87 about the shaft 2, the water may be drained through ducts 92. (Indicated by dotted outline in Figs. 7, 8, and 10.) Means are provided for draining any possible accumulation of condensation between the ends of the plugs 57. Such condensation would counterbalance the steam-pressure against the faces of the disks 23 and 24 if this condensation were not drawn out. The duct 88 leads from the space 94 between the ends of the plugs 57 to the surface of the disk and escapes in the atmosphere. The duct is cored out in the disk, and the plug 86, having a proper-size opening therethrough, is used to close the cored-out passage. The heads 6 and 7 are cut away about the central part to let out any possible moisture. Another object is to equalize the friction and prevent unequal wearing on the outer parts of the faces of the disks.

The spaces about the juncture of the pistons 25 and 26 with the disks 23 and 24 and in which the springs 27 are seated are packed by annular rings 95, which are countersunk in the disks and in the piston.

The operation of the various details has been described above. The steam is admitted to the cylinders by the valve 13. The disks 23 and 24 are driven by the expansive force of steam. The pistons 25 and 26, carried by the disks, and the pistons 30 and 31, which are mounted in the casing, coöperate to form intermittently pockets for the expansion of steam. The steam acts on the outer ends of the pistons 25 and 26 as if these pistons were mere vanes for the purpose of driving the disks. The pistons reciprocate by reason of the cams heretofore described and the springs behind the pistons, the cams 29 of the casing causing the pistons of the disks to retreat within the disks and the cams on the disks causing the pistons of the casing to retreat within the casing. The pockets intermittently formed between the pistons carried by the disks and those mounted in the casing will receive the steam, and the expansive force of the steam will tend to press the pistons against the wall or packing of the pistons on the opposite side from the steam-pressure, and thus cause friction. This is prevented by constructing the pistons with small ports, so that a little steam can pass through the pistons to the opposite side from the steam-pressure. The pistons are in this manner steam-balanced. The manner of balancing the disks is above described. The balancing of the pistons and the disks in this manner reduces the friction to a minimum. By reason of this balancing of the piston the pistons in the disks and the pistons in the casing coöperate with each other, and one pair of pistons is operated by the expansive force of steam while the exhaust is escaping in front of the pistons carried by the other disk.

Various changes may be made in the construction of this engine without departing from my invention. It is apparent that the number of disks and the number of pistons may be increased indefinitely.

Having fully described my invention, what I claim as new, and desire to secure by Letters Patent, is—

1. A rotary engine comprising a casing, a partition dividing said casing into two cylinders, a piston-carrying disk mounted in each part, a shaft provided with suitable bearings and carrying said disk, a reciprocating piston carried in each disk, the disk of one piston being arranged diametrically opposite the piston of the other disk, a cam on each disk, coöperating reciprocatory pistons mounted in said casing, each part of said casing having a cam formed thereon to coöperate with the cams on said disks, and means for feeding steam to said cylinders.

2. A rotary engine having a casing, a partition dividing said casing into two cylinders, each cylinder having cams formed thereon, piston-carrying disks mounted in said cylinders and having cams formed on the peripheries thereof, reciprocatory pistons mounted in said disks and operating through the crest of said cams, and coöperating pistons mounted in said casing and operating through the crests of the cams formed in said cylinders.

3. A rotary engine having cylinders provided with cams on the interior surfaces thereof, piston-carrying disks mounted in said cylinders and provided with coöperating cams on the peripheries thereof, spring-actuated pistons mounted in said disks and operating radially through the cams on said disks, and coöperating spring-actuated pistons mounted in the casing of said cylinders and moving concentrically through the cams of said cylinders.

4. A rotary engine having two cylinders, a rotary piston-carrying disk mounted in each cylinder, a steam-balanced spring-actuated piston mounted in each disk and operating radially through the periphery thereof, the pistons of said disks being arranged diametrically opposite each other, a coöperating reciprocatory spring-actuated piston mounted in the casing of each cylinder, and suitable inlet and exhaust for said cylinders.

5. A rotary engine having two cylinders, a rotary piston-carrying disk mounted in each cylinder and having a cam formed on the periphery thereof, a spring-actuated piston mounted in each disk and operating radially through the crest of said cam, the piston of said disk being arranged diametrically opposite each other, a coöperating cam formed in each cylinder, a coöperating reciprocatory spring-actuated piston mounted in the casing of each cylinder and moving concentrically through the crest of the cam thereof, and means for operating said engine.

6. A rotary engine having two cylinders, a rotary piston-carrying disk mounted in each cylinder, a cam formed on the periphery of each disk, a spring-actuated reciprocatory piston mounted in each disk and operating radially through the crest of said cam, the pistons of said disks being arranged diametrically opposite each other whereby one disk with its piston counterbalances the other disk with its piston, a coöperating reciprocatory spring-actuated piston mounted in the casing of each cylinder, and means for operating said engine.

7. A rotary engine having two cylinders, a rotary piston-carrying disk mounted in each cylinder and having a cam formed on the periphery thereof, a spring-actuated reciprocatory piston mounted in each disk and operating radially through the crest of said cam, the pistons of said disks being arranged diametrically opposite each other whereby one disk is adapted to counterbalance the other disk, each cylinder having an interior cam, a coöperating reciprocating spring-actuated piston mounted in the casing of each cylinder whereby the piston of one casing and the piston of the disk mounted in said cylinder are adapted to form intermittently pockets for the expansion of steam, and means for operating the engine.

8. A rotary engine having two cylinders, a piston-carrying disk mounted in each cylinder, means for automatically expanding said disks axially, a spring-actuated piston mounted in each disk and operating radially through the periphery thereof, and a coöperating reciprocatory piston mounted in the casing of each cylinder, and moving concentrically therein to form intermittent steam cut-offs with the coöperating piston in each disk.

9. In a rotary engine, two cylinders having a common steam-chest formed adjacent thereto, a port leading from said chest to each cylinder, each cylinder having a cam formed on the interior surface thereof, a reciprocatory piston mounted in said casing for each cylinder, a rotary piston-carrying disk mounted in each cylinder and having a cam formed on the periphery thereof, a reciprocatory piston mounted in each disk and moving radially through the crest of the cam on said disk and coöperating with the piston in said casing, and means for operating said disks.

10. In a rotary engine, two cylinders each having a cam formed on the interior surface thereof, a rotary piston-carrying disk mounted in each cylinder and having a coöperating cam formed on the periphery thereof, a reciprocatory piston mounted in each disk and moving radially through the crest of the cam thereon, a coöperating reciprocatory piston mounted in the casing of each cylinder and moving concentrically through the crest of the cam formed therein, and means for axially expanding said disks to take up wear caused by friction.

11. In a rotary engine, disks of the character indicated, means for expanding said disks axially consisting of L-shaped packing-rings mounted in the periphery of said disk, wedge-shaped packing-rings mounted concentrically in said disks adjacent to said L-shaped rings, steam packing-rings mounted concentrically within said wedge-shaped rings, and means for expanding said steam packing-rings with steam.

12. In a rotary engine, provided with disks of the character indicated, L-shaped packing-rings mounted in the periphery of said disks and forming parts of the faces of said disks and means for expanding said rings axially with steam from within said disks.

13. In a rotary engine, provided with disks of the character indicated, packing-rings forming parts of the peripheries and parts of the faces of said disks, and means for expanding said rings axially consisting of packing-rings mounted in said disks concentrically within said first-named packing-rings, and plugs mounted in said disks and having steam-passages therethrough, connecting steam-passages leading therefrom formed in said disks and leading to said last-named packing-rings.

14. In a rotary engine provided with disks carrying packing elements, means for expanding said elements by steam from within said disks.

15. In a rotary engine provided with disks of the character indicated, L-shaped packing-rings forming parts of the peripheries and parts of the faces of said disks, wedge-shaped packing-rings mounted in said disks concentrically within said L-shaped rings, steam packing-rings concentrically within said wedge-shaped rings, and means for expanding said steam packing-rings radially.

16. In a rotary engine provided with disks of the character indicated, L-shaped rings forming parts of the peripheries of said disks and parts of the faces thereof, perforated plugs mounted in said disks, one plug being rigid with each of said rings, and means for expanding said rings axially consisting of wedging-rings mounted in said disks concentrically within said L-shaped rings, and steam packing-rings concentrically within said wedging-rings, said disks having steam-passages leading from said plug to said packing-ring.

17. In a rotary engine provided with disks of the character indicated, means for expanding said disks axially and means for balancing the pressure of the expansion with steam.

18. In a rotary engine provided with disks of the character indicated, expansible rings, wedging-rings, packing-rings adapted to actuate said wedging-rings, means for directing steam against said packing-rings, and means for balancing said disks with steam.

19. In a rotary engine provided with disks of the character indicated, expansible rings, wedging-rings, packing-rings, and perforated plugs rigid with said expansible rings, said disks having suitable steam-inlets in connection with said plugs.

20. In a rotary engine provided with a pair of cylinders and a pair of disks mounted in said cylinders, expansible rings, wedging-rings, means for expanding said wedging-rings radially, and perforated plugs rigid with said expansible rings, said disks having suitable steam-inlets in connection with said plugs and said cylinders having annular grooves in communication with the passages through said plugs.

21. In a rotary engine provided with a pair of cylinders and a pair of disks mounted in said cylinders, expansible rings carried by said disks and perforated plugs carried by said rings, said disks having suitable steam-inlets whereby said rings are expanded by the force of steam.

22. In a rotary engine provided with a plurality of cylinders and a plurality (one for each cylinder) of piston-carrying disks mounted in said cylinders, expansible rings carried by said disks, and perforated plugs mounted in said disks, said disks having suitable steam-inlets in communication with said plugs whereby said rings are expanded by the force of steam.

23. In a rotary engine provided with a plurality of cylinders and a plurality of disks (one for each cylinder) mounted in said cylinders, expansible rings carried by said disks, and perforated plugs in combination with said rings, said disks and said cylinders having suitable steam-inlets in communication with said plugs whereby said rings are expanded by the force of steam.

24. In a rotary engine provided with a plurality of cylinders and a plurality of disks mounted in said cylinders, expansible rings carried by said disks, and perforated plugs carried in said disks, said disks having suitable ducts in communication with said plugs whereby said rings are expanded by the force of steam and said cylinders having annular grooves in communication with said plugs whereby said disks are counterbalanced with steam.

25. In a rotary engine provided with pistons made in two parts and united by dovetailed joints, spring-actuated plates for preventing the leakage of steam through said dovetailed joints.

26. In a rotary engine of the character indicated, pistons and steam-balanced packing-plugs coöperating therewith.

27. In a rotary engine of the character indicated, pistons, packing-plugs coöperating therewith, and packing-bars countersunk in said plugs.

28. In a rotary engine of the character indicated, pistons, springs for actuating said pistons, packing-plugs in combination with said pistons, and packing-bars countersunk in said plugs.

29. In a rotary engine of the character indicated, spring-actuated pistons, packing-plugs in combination with said pistons, and spring-actuated packing-bars countersunk in said plugs.

30. In a rotary engine of the character indicated, pistons, packing-plugs in combination with said pistons, each plug being made in three parts dovetailed together, and spring-actuated packing-bars countersunk in said plugs, said plugs having suitable passages therethrough for balancing said plugs with steam.

31. In a rotary engine of the character indicated, pistons, packing-plugs in combination with said pistons, spring-actuated packing-bars countersunk in said plugs, said plugs being made in three parts and dovetailed together, and means for breaking the dovetailed joints of said plugs, said plugs having suitable pockets and passages for counterbalancing said plugs with steam.

32. In a rotary engine provided with a plurality of cylinders and a plurality of disks mounted in said cylinders, said disks and said cylinders having coöperating cams and coöperating pistons reciprocating through the crests of said cams, said pistons being provided with suitable steam-pockets and passages therethrough whereby said pistons are counterbalanced.

33. A rotary engine having a plurality of cylinders, piston-carrying disks mounted in said cylinders, spring-actuated pistons mounted in said disks and operating radially therein, and coöperating reciprocatory pistons mounted in the casings of said cylinders and moving concentrically therein, said pistons having steam-passages therethrough whereby said pistons are steam-balanced.

In testimony whereof I set my hand, in the presence of two witnesses, this 10th day of June, 1904.

JOHN R. SCOFIELD.

Witnesses:
    W. B. RITTENBERRY,
    W. D. TROETLE.